(12) United States Patent
Gong et al.

(10) Patent No.: US 9,313,011 B2
(45) Date of Patent: Apr. 12, 2016

(54) METHOD AND APPARATUS FOR SCHEDULING TERMINALS IN SYSTEM WITH MULTIPLE ANTENNA ELEMENTS COMBINING INTO COMMON CELL

(71) Applicant: Huawei Technologies Co., Ltd., Shenzhen (CN)

(72) Inventors: Bing Gong, Shenzhen (CN); Dageng Chen, Shenzhen (CN); Xueli Kong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 14/021,380

(22) Filed: Sep. 9, 2013

(65) Prior Publication Data
US 2014/0010217 A1    Jan. 9, 2014

Related U.S. Application Data

(63) Continuation of application No. PCT/CN2012/072085, filed on Mar. 8, 2012.

(30) Foreign Application Priority Data

Mar. 9, 2011    (CN) .......................... 2011 1 0056389

(51) Int. Cl.
*H04J 3/00*    (2006.01)
*H04L 5/00*    (2006.01)
(Continued)

(52) U.S. Cl.
CPC ............. *H04L 5/006* (2013.01); *H04W 72/085* (2013.01); *H04B 7/022* (2013.01); *H04B 7/0452* (2013.01); *H04B 7/0632* (2013.01)

(58) Field of Classification Search
CPC ............................ H04L 5/006; H04W 72/085
See application file for complete search history.

(56) References Cited

U.S. PATENT DOCUMENTS

2003/0148770 A1* 8/2003 Das et al. ...................... 455/455
2005/0064872 A1    3/2005 Osseiran et al.
(Continued)

FOREIGN PATENT DOCUMENTS

CN    101442808 A    5/2009
CN    101577940 A    11/2009
(Continued)

OTHER PUBLICATIONS

Huawei, "Downlink CoMP system evaluation and feedback analysis for each category" Agenda Item 15.2, 3GPP TSG RAN WG1 meeting #57, San Franciso, USA, May 4-8, 2009, R1-091799, 6 pages.
(Continued)

*Primary Examiner* — Hassan Kizou
*Assistant Examiner* — Abdelnabi Musa
(74) *Attorney, Agent, or Firm* — Brinks Gilson & Lione

(57) ABSTRACT

A method and an apparatus for scheduling terminals in a system with multiple antenna elements combining into a common cell are provided. The method includes: receiving channel quality information fed back by the multiple terminals in the common cell, determining, according to the channel quality information fed back by the multiple terminals, all terminals capable of being bound to each antenna element; determining a first antenna element among the antenna elements in the common cell on a first time domain resource within a scheduling granularity, determining a terminal to be served on the first time domain resource, and beginning to serve the terminal; and scheduling all terminals capable of being bound to the first antenna element on each remaining time domain resource within the scheduling granularity, determining a terminal to be served on each remaining time domain resource, and beginning to serve the terminal.

14 Claims, 14 Drawing Sheets

(51) Int. Cl.
*H04W 72/08* (2009.01)
*H04B 7/02* (2006.01)
*H04B 7/04* (2006.01)
*H04B 7/06* (2006.01)

(56) References Cited

U.S. PATENT DOCUMENTS

| | | | |
|---|---|---|---|
| 2009/0017843 A1* | 1/2009 | Laroia et al. | 455/458 |
| 2010/0261482 A1 | 10/2010 | Guey | |
| 2010/0323712 A1 | 12/2010 | Guey et al. | |
| 2011/0263218 A1* | 10/2011 | Ishii | 455/138 |
| 2012/0002740 A1* | 1/2012 | Han et al. | 375/260 |
| 2012/0106442 A1* | 5/2012 | Xiao | 370/328 |
| 2012/0140706 A1* | 6/2012 | Doppler et al. | 370/328 |

FOREIGN PATENT DOCUMENTS

| | | |
|---|---|---|
| CN | 101827387 A | 9/2010 |
| CN | 101888665 A | 11/2010 |
| CN | 101951307 A | 1/2011 |

OTHER PUBLICATIONS

Qualcomm Europe, "TP for feedback in support of DL CoMP for LTE-A TR" Agenda Item 15,2, 3GPP TSG-RAN WG1 #57, San Franciso, CA, May 4-8, 2009, R1-092290, 4 pages.

InterDigital Communications, LLC, "Considerations on R11 CoMP proposals" Agenda Item 6.3.1.2, 3GPP TSG RAN WG1 Meeting #63bis, Dublin, Ireland, Jan. 17-21, 2011, R1-110115, 2 pages.

Brueck et al., "Centralized Scheduling for Joint Transmission Coordinated Multi-Point in LTE-Advanced" 2010 International ITG Workshop ON Smart Antennas (WSA 2010) IEEE 2010, 8 pages.

* cited by examiner

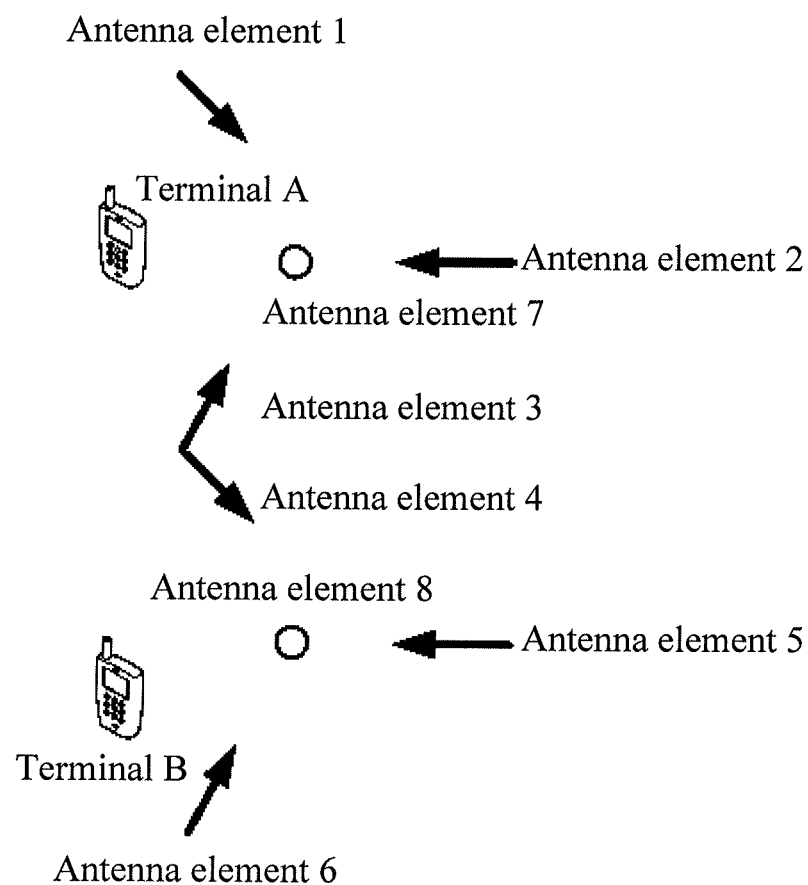
FIG. 2-a

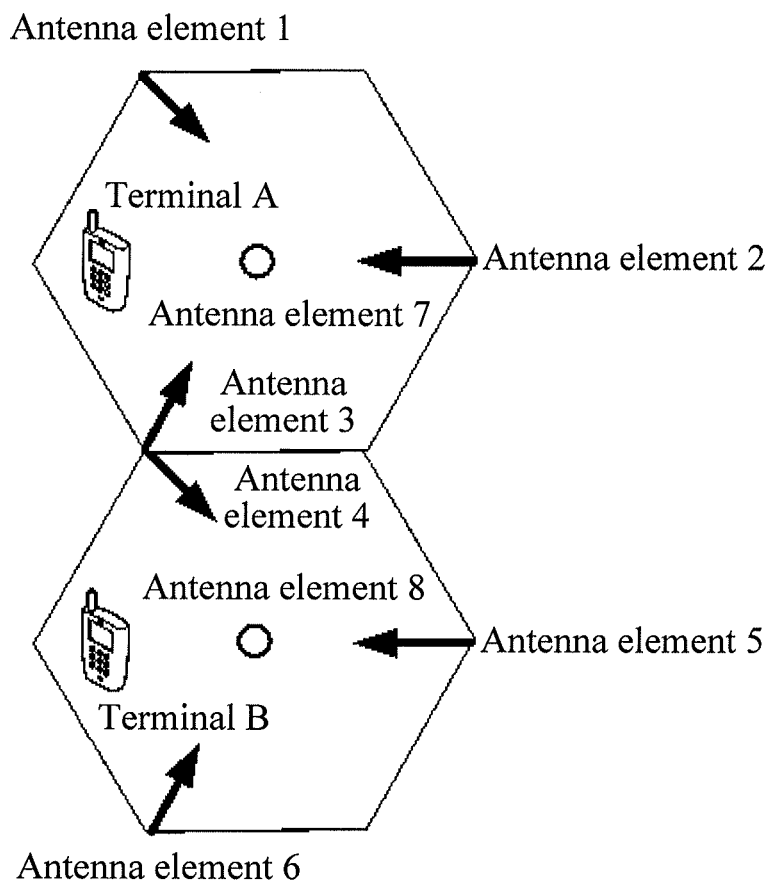
FIG. 2-b

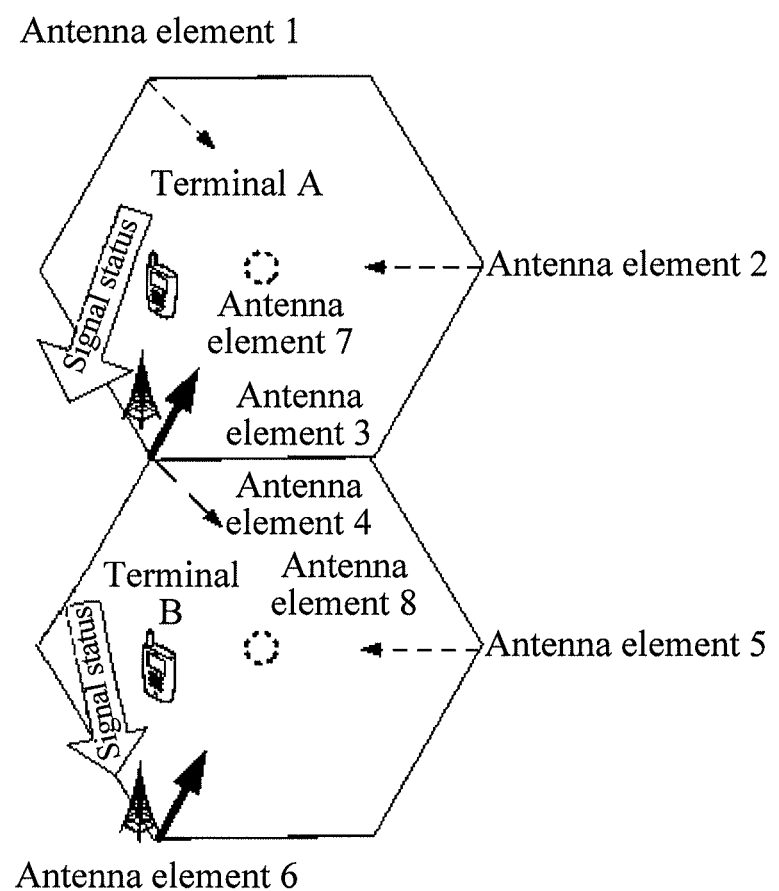
FIG. 4-a

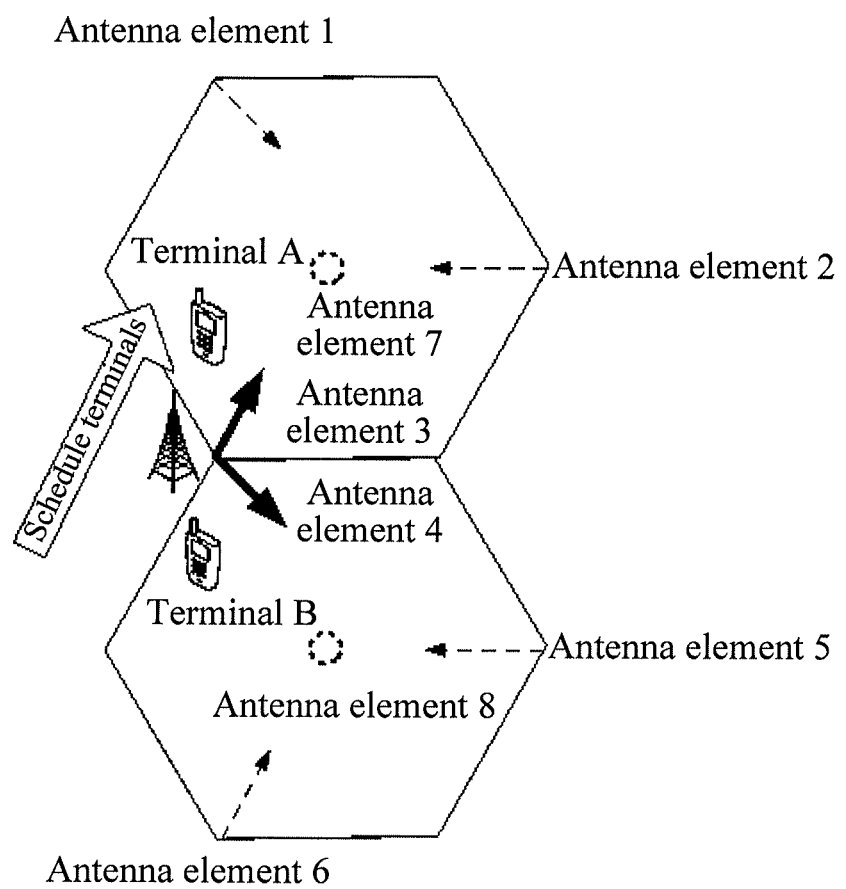
FIG. 4-b

METHOD AND APPARATUS FOR SCHEDULING TERMINALS IN SYSTEM WITH MULTIPLE ANTENNA ELEMENTS COMBINING INTO COMMON CELL

CROSS-REFERENCE TO RELATED APPLICATIONS

This application is a continuation of International Application No. PCT/CN2012/072085, filed on Mar. 8, 2012 which claims priority to Chinese Patent Application No. 201110056389.8, filed on Mar. 9, 2011, both of which are hereby incorporated by reference in their entireties.

FIELD

The present disclosure relates to the field of wireless communication technologies, and in particular, to a method and an apparatus for scheduling terminals in a system with multiple antenna elements combining into a common cell.

BACKGROUND

The rapid development and rich service operation modes of modern wireless communication technologies invigorate mobile communication networks. Conventional mobile communication networks can hardly meet people's requirements for high capacity, high transmission rate, and high reliability. Therefore, upgrading the existing mobile communication networks is an unavoidable trend. Nowadays, the worldwide wireless networks need innovations urgently. For the GSM (Global System for Mobile Communication, Global System for Mobile Communication) network having numerous mobile users, the focus of the upgrade of mobile communication networks is ultimately the upgrade of the GSM network, which has a wide prospect of market application in the future mobile broadband field. In view of the investment protection and user habits of the existing massive GSM network, the future mobile network is a GSM-based converged wireless network that supports multiple wireless standards. In a converged network of the GSM and LTE (Long Time Evolution, Long Time Evolution), if the GSM system and the LTE system share antennas, the cost may be greatly reduced. However, when the GSM system and the LTE system share antennas, the problem of severe inter-cell interferences occurs.

In the prior art, a method for solving the problem of inter-cell interferences that occurs when the GSM system and the LTE system share antennas is as follows: an antenna element of a current cell and an antenna element of a neighboring cell transmit one same signal to a mobile terminal at the same time and at the same frequency, in which, for the terminal, the antenna element of the current cell and the antenna element of the neighboring cell serve the terminal together, which is equivalent to that the interference signal transmitted by the antenna element of the neighboring cell is converted into a serving signal, which therefore reduces the interferences between cells. In this case, the antenna element of the current cell and the antenna element of the neighboring cell serve the mobile terminal together. Therefore, the antenna element of the current cell and the antenna element of the neighboring cell form a cell, and the cell is a common cell. FIG. 1 is an architecture diagram of a common cell formed of cells that include multiple antenna elements. Further, FIG. 2-a is a schematic diagram of a terminal being interfered before multiple antenna elements combine into a common cell in the prior art. As shown in FIG. 2-a, the arrow indicates an antenna element with a unidirectional antenna, and the circle indicates an antenna element with an omnidirectional antenna. For terminal A, antenna element 3 in the cell that covers terminal A is a serving antenna element. Therefore, antenna element 3 transmits a serving signal, and antenna elements 1, 2, 4, 5, 6, 7, and 8 of other neighboring cells all transmit interference signals. For terminal B, antenna element 6 in the cell that covers terminal B is a serving antenna element. Therefore, antenna element 6 transmits a serving signal, and antenna elements 1, 2, 3, 4, 5, 7, and 8 of other neighboring cells all transmit interference signals. FIG. 2-b is a schematic diagram of a terminal being interfered after multiple antenna elements combine into a common cell in the prior art, and after antenna elements 1, 2, 7, and 3 combine into a common cell and antenna elements 4, 5, 6, and 8 combine into a common cell, for terminal A, antenna elements 1, 2, 7, and 3 all transmit serving signals; for terminal B, antenna elements 4, 5, 6, and 8 all transmit serving signals. Although the foregoing method reduces inter-cell interference signals in the amount, for terminal A, antenna elements 4, 5, 6, and 8 still transmit interference signals; also, for terminal B, antenna elements 1, 2, 7, and 3 still transmit interference signals. Moreover, each terminal is served by multiple antenna elements at the same time. Such "excessive serving" also leads to the problem of waste of system resources.

To further overcome the problem in the foregoing method, another method in the prior art is as follows: after multiple antenna elements combine into a common cell, a terminal measures the channel quality of each antenna element in the common cell during signal transmission and feeds back the channel quality to the base station, and the base station selects a serving antenna element for the terminal according to the feedback information, and other antenna elements that are not selected do not transmit signals to the terminal. FIG. 3 is a schematic diagram of a terminal being interfered after multiple antenna elements combine into a common cell and an antenna element is selected in the prior art. For terminal A, the base station selects, according to the channel quality, from antenna elements 1, 2, 7, and 3 in the common cell, antenna element 3 as an antenna element capable of binding terminal A (namely, antenna element 3 is capable of serving terminal A). Likewise, for terminal B, the base station selects, according to the channel quality, from antenna elements 4, 5, 6, and 8 in the common cell, antenna element 6 as an antenna element capable of binding terminal B (namely, antenna element 6 is capable of serving terminal B). In this way, for terminal A, because antenna elements 4, 5, and 8 do not transmit signals, only antenna element 6 transmits interference signals; also, for terminal B, only antenna element 3 transmits interference signals. Moreover, each terminal is only served by one antenna element, which avoids the problem of resource waste caused by "excessive serving".

However, in the research process, the inventor of the present disclosure finds that the antenna selection solution after multiple antenna elements combine into a common cell has the following disadvantages. FIG. 4-a is a schematic diagram of terminal A being interfered when the base station receives channel quality information fed back by the terminal in the prior art. As shown in FIG. 4-a, the base station selects, according to the feedback channel quality information, antenna element 3 as a binding antenna element for terminal A; meanwhile, terminal A is interfered by interference signals transmitted by antenna element 6 of the neighboring cell. FIG. 4-b is a schematic diagram of terminal A being interfered when the base station begins to serve terminal A in the prior art. After a period, the base station begins to serve terminal A by delivering data to terminal A. At this time, terminal A and the PDSCH (Physical Downlink Shared Channel, physical downlink shared channel) are interfered by interference signals transmitted by antenna element 4 of the neighboring cell. Therefore, the interferences are changed from the time that terminal A sends the channel quality information, and the signal to interference plus noise ratio of the PDSCH is not equal to the signal to interference plus noise ratio in the channel quality information, namely, the interference fluctuates. Evidently, when the terminal feeds back the channel quality information to the base station and when the base station begins to serve terminal A, terminal A is interfered by signals transmitted by different antenna elements of the neighboring cell, which leads to interference fluctuation.

SUMMARY OF THE DISCLOSURE

To solve the foregoing problem, an embodiment of the present disclosure provides a method and an apparatus for scheduling terminals in a system with multiple antenna elements combining into a common cell to reduce the influences caused by interference fluctuation.

An embodiment of the present disclosure discloses the following solution:

A method for scheduling terminals in a system including a common cell that includes multiple antenna elements and multiple terminals The method includes: receiving channel quality information fed back by the multiple terminals in the common cell, where the channel quality information is configured to reflect channel quality of channels between the multiple terminals and each antenna element of the multiple antenna elements in the common cell; determining, according to the channel quality information fed back by the multiple terminals, all terminals capable of being bound to each antenna element; determining a first antenna element among the antenna elements in the common cell on a first time domain resource within a scheduling granularity, determining a terminal to be served on the first time domain resource, and beginning to serve the terminal; and scheduling all terminals capable of being bound to the first antenna element on each remaining time domain resource within the scheduling granularity, determining a terminal to be served on each remaining time domain resource, and beginning to serve the terminal, where the scheduling granularity for any terminal of the multiple terminals in the common cell is greater than a time difference between receiving the channel quality information fed back by the any terminal and beginning to serve the any terminal for the first time, and all the terminals capable of being bound to the first antenna element are determined according to all the terminals capable of being bound to each antenna element.

An embodiment of the present disclosure discloses the following solution:

An apparatus for scheduling terminals in a system including a common cell that includes multiple antenna elements and multiple terminals. The apparatus includes: a receiving unit, configured to receive channel quality information fed back by the multiple terminals in the common cell, where the channel quality information is configured to reflect channel quality of channels between the multiple terminals and each antenna element of the multiple antenna elements in the common cell; a determination unit, configured to determine, according to the channel quality information fed back by the multiple terminals, all terminals capable of being bound to each antenna element; a first time domain resource scheduling unit, configured to determine a first antenna element among the antenna elements in the common cell on a first time domain resource within a scheduling granularity, determine a terminal to be served on the first time domain resource, and begin to serve the terminal; and a remaining time domain resource scheduling unit, configured to schedule all terminals capable of being bound to the first antenna element on each remaining time domain resource within the scheduling granularity, determine a terminal to be served on each remaining time domain resource, and begin to serve the terminal, where the scheduling granularity for any terminal of the multiple terminals in the common cell is greater than a time difference between receiving the channel quality information fed back by the any terminal and beginning to serve the any terminal for the first time, and all the terminals capable of being bound to the first antenna element are determined according to all the terminals capable of being bound to each antenna element.

An embodiment of the present disclosure discloses the following solution:

A system with multiple antenna elements combining into a common cell includes a base station and multiple terminals. The multiple terminals are configured to feed back channel quality information to the base station, where the channel quality information is configured to reflect channel quality of channels between the multiple terminals and each antenna element of the multiple antenna elements in the common cell; and the base station is configured to receive the channel quality information fed back by the multiple terminals in the common cell, where the channel quality information is configured to reflect channel quality of channels between the multiple terminals and each antenna element of the multiple antenna elements in the common cell; determine, according to the channel quality information fed back by the multiple terminals, all terminals capable of being bound to each antenna element; determine a first antenna element among the antenna elements in the common cell on a first time domain resource within a scheduling granularity, determine a terminal to be served on the first time domain resource, and begin to serve the terminal; and schedule all terminals capable of being bound to the first antenna element on each remaining time domain resource within the scheduling granularity, determine a terminal to be served on each remaining time domain resource, and begin to serve the terminal, where the scheduling granularity for any terminal of the multiple terminals in the common cell is greater than a time difference between receiving the channel quality information fed back by the any terminal and beginning to serve the any terminal for the first time, and all the terminals capable of being bound to the first antenna element are determined according to all the terminals capable of being bound to each antenna element.

As can be seen from the foregoing embodiments, in a common cell, the first antenna element and the terminal to be served on the first time domain resource are determined on the first time domain resource within the scheduling granularity; on each remaining time domain resource within the scheduling granularity, all the terminals capable of being bound to the first antenna element are scheduled, and the terminal to be served on each remaining time domain resource is further determined and begins to be served. In this way, the antenna element does not change within the whole scheduling granularity. Terminals in other common cells are interfered by the same antenna element all the time. That is, when the terminal feeds back the channel quality to the base station, and, when the base station begins to serve the terminal by delivering data, the terminal is interfered by signals transmitted by the same antenna element, which reduces the influences caused by interference fluctuation.

BRIEF DESCRIPTION OF THE DRAWINGS

To make the solutions of the embodiments of the present disclosure or the prior art clearer, the accompanying drawings used in the description of the embodiments or the prior art are briefly described hereunder. Evidently, the accompanying drawings illustrate only some exemplary embodiments of the present disclosure and persons of ordinary skill in the art can derive other drawings from these drawings without creative efforts.

FIG. 2-*a* is a schematic diagram of a terminal being interfered before multiple antenna elements combine into a common cell in the prior art;

FIG. 2-*b* is a schematic diagram of a terminal being interfered after multiple antenna elements combine into a common cell in the prior art;

FIG. 4-*a* is a schematic diagram of antenna elements selected by a base station for terminal A and terminal B when the base station receives channel quality fed back by the terminals for the first time in the prior art;

FIG. 4-*b* is a schematic diagram of antenna elements reselected by a base station for terminal A and terminal B when the base station receives channel quality fed back by the terminals again in the prior art;

DETAILED DESCRIPTION OF THE EMBODIMENTS

To make the objectives, features, and advantages of the present disclosure clearer, the following describes the embodiments of the present disclosure in detail with reference to the accompanying drawings.

Embodiment 1

Figure 1:
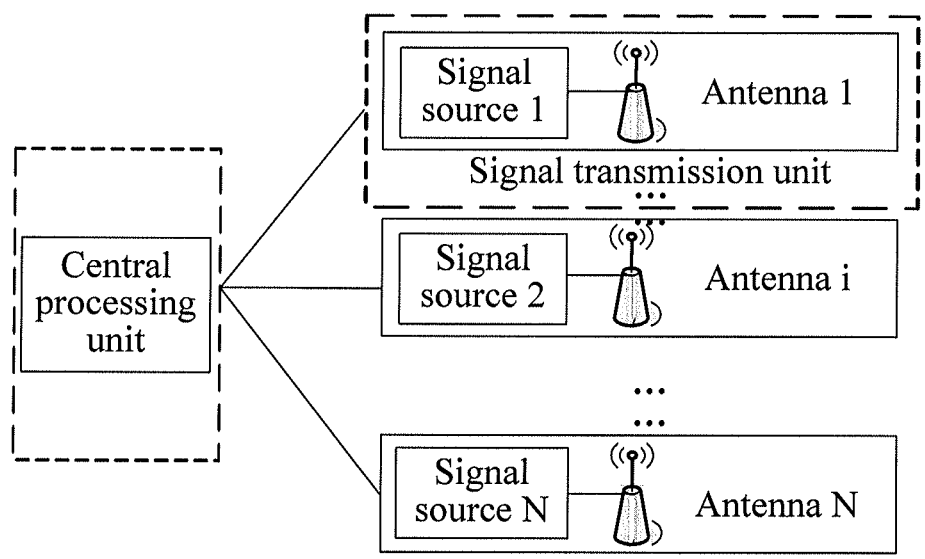
FIG. 1 is a structural diagram of a common cell formed of cells that include multiple antenna elements.
Figure 3:
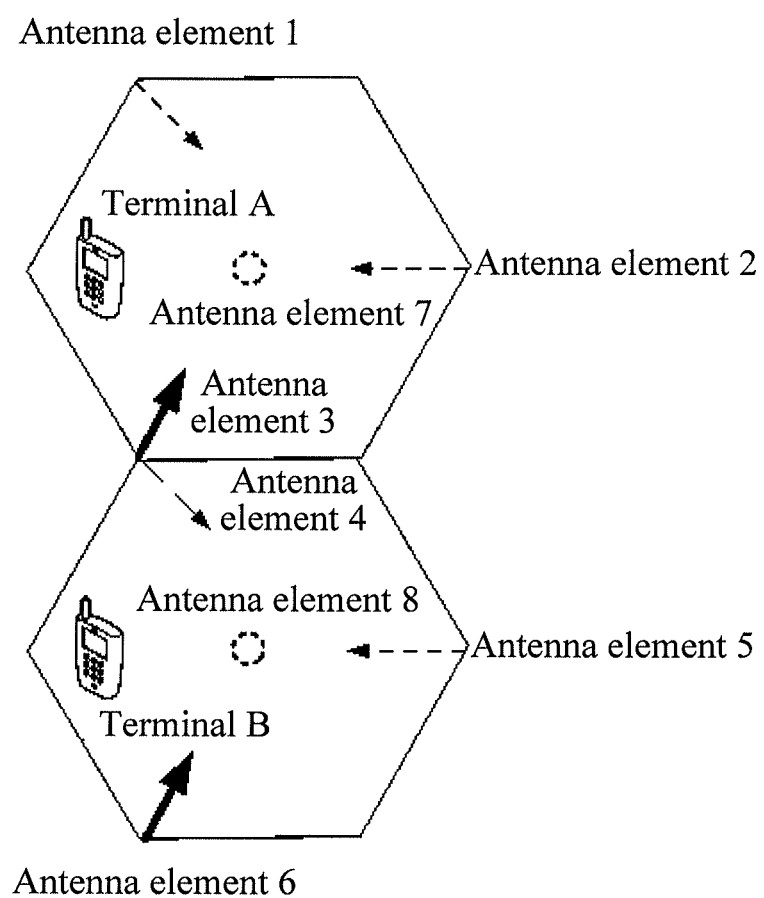
FIG. 3 is a schematic diagram of a terminal being interfered after multiple antenna elements combine into a common cell and an antenna element is selected in the prior art.
Figure 5:
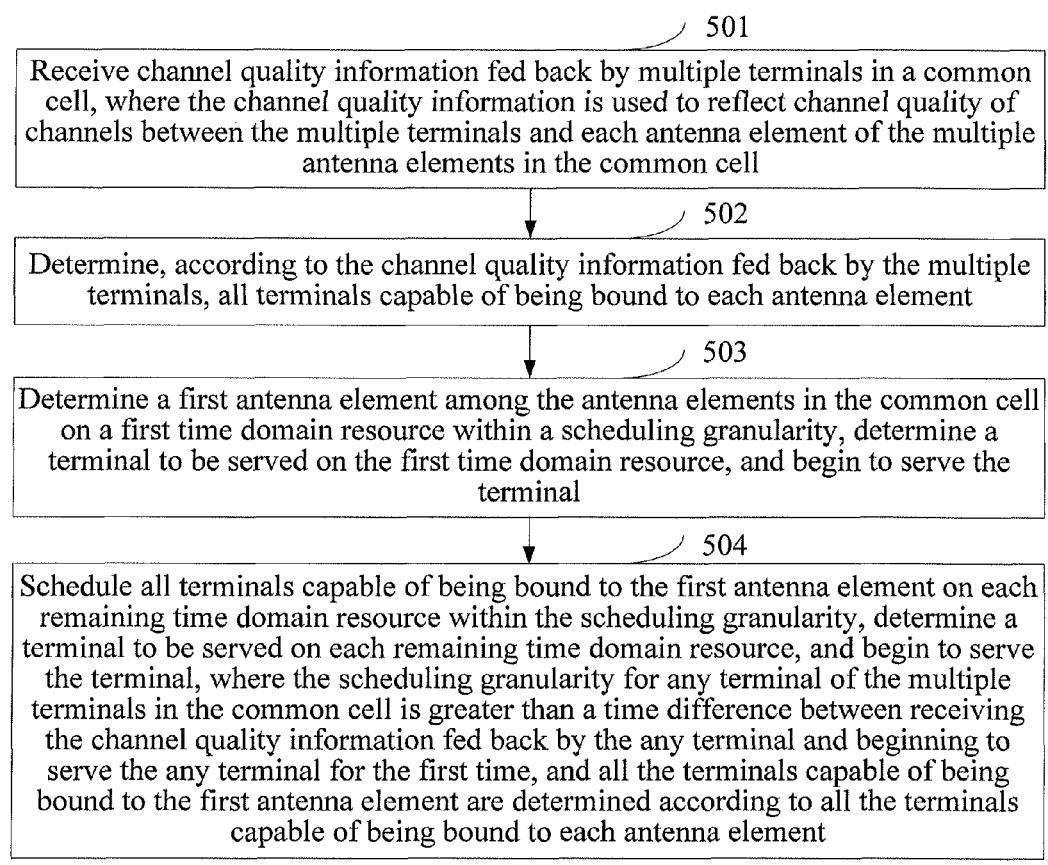
FIG. 5 is a flow chart of a method for scheduling terminals in a system with multiple antenna elements combining into a common cell according to an embodiment of the present disclosure.

FIG. 5 is a flow chart of a method for scheduling terminals in a system with multiple antenna elements combining into a common cell according to an embodiment of the present disclosure. As shown in FIG. 5, the method includes:

Step 501: Receive channel quality information fed back by multiple terminals in a common cell, where the channel quality information is configured to reflect channel quality of channels between the multiple terminals and each antenna element of the multiple antenna elements in the common cell.

It should be noted that the common cell of multiple antenna cells includes multiple antenna elements and multiple terminals.

For a specific physical area, for example, in Chaoyang District of Beijing City, multiple common cells exist. Within any common cell, the channel quality information fed back by multiple terminals in the common cell is received.

In an embodiment, a terminal may feed back the channel quality information directly to feedback the channel quality of the channel between the terminal and each antenna element; in another embodiment, the terminal may feed back an uplink reference signal as channel quality information to indirectly feed back the channel quality of the channel between the terminal and each antenna element; in another embodiment, the terminal may use other information indicative of the channel quality of the channel between the terminal and each antenna element in the prior art as channel quality information to indirectly feed back the channel quality of the channel between the terminal and each antenna element.

Figure 6:
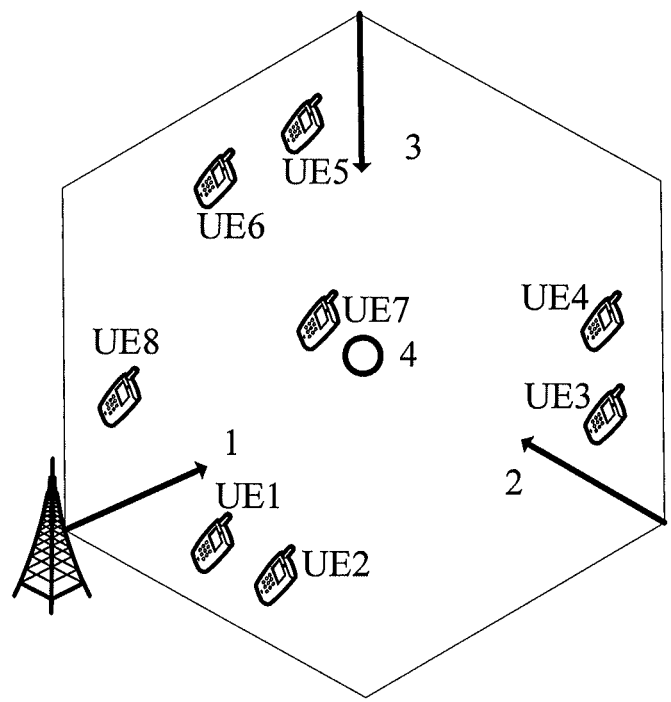
FIG. 6 is a schematic structural diagram of a common cell of multiple antenna elements according to the present disclosure.

FIG. 6 is a schematic structural diagram of a common cell of multiple antenna elements according to the present disclosure. A common cell shown in FIG. 6 includes 4 antenna elements: antenna element 1, antenna element 2, antenna element 3, and antenna element 4, where antenna elements 1, 2, and 3 are unidirectional antenna elements and antenna element 4 is an omnidirectional antenna element. The common cell shown in FIG. 6 includes 8 terminals. The base station allocates specific reference signal resources to the 4 antenna elements. At the specific reference signal positions, the 8 terminals in the common cell measure the channel quality of the channel between the terminal and each antenna element of the 4 antenna elements, and then feed back the measured channel quality to the base station through channel quality information. Likewise, the terminals in other common cells feed back the channel quality information to the base station in the foregoing way.

Step 502: Determine, according to the channel quality information fed back by the multiple terminals, all terminals capable of being bound to each antenna element.

It should be noted that each antenna element may serve all the terminals bound to the antenna element.

For example, the base station determines, according to the channel quality fed back by the terminals in the common cell shown in FIG. 6, all the terminals capable of being bound to each antenna element. All the terminals capable of being bound to antenna element 1 are terminals 1, 2, and 8, the terminals capable of being bound to antenna element 2 are terminals 3 and 4, the terminals capable of being bound to antenna element 3 are terminals 5 and 6, and the terminal capable of being bound to antenna element 4 is terminal 7.

Of course, it can be easily understood that if the number of terminals capable of being bound to an antenna element is zero, the antenna element serves no terminal.

Step 503: Determine a first antenna element among the antenna elements in the common cell on a first time domain resource within a scheduling granularity, determine a terminal to be served on the first time domain resource, and begin to serve the terminal.

Step 504: Schedule all terminals capable of being bound to the first antenna element on each remaining time domain resource within the scheduling granularity, determine a terminal to be served on each remaining time domain resource, and begin to serve the terminal, where the scheduling granularity for any terminal of the multiple terminals in the common cell is greater than a time difference between receiving the channel quality information fed back by the any terminal and beginning to serve the any terminal for the first time, and all the terminals capable of being bound to the first antenna element are determined according to all the terminals capable of being bound to each antenna element.

As can be seen from the foregoing embodiments, in a common cell, the first antenna element and the terminal to be served on the first time domain resource are determined on the first time domain resource within the scheduling granularity, and the terminal begins to be served; on each remaining time domain resource within the scheduling granularity, all the terminals capable of being bound to the first antenna element are scheduled, and the terminal to be served on each remaining time domain resource is further determined and begins to be served. In this way, the antenna element does not change within the whole scheduling granularity. Terminals in other common cells are interfered by the same antenna element all the time. That is, when the terminal feeds back the channel quality to the base station, and, when the base station begins to serve the terminal by delivering data, the terminal is interfered by signals transmitted by the same antenna element, which reduces the influences caused by interference fluctuation.

Embodiment 2

Different from Embodiment 1, this embodiment further limits step 503 in Embodiment 1.

That is, at each scheduling, PF (Proportionally Fair, proportionally fair) or round robin (RR) scheduling is performed on all terminals in the common cell on the first time domain resource within the scheduling granularity, and the first terminal to be served on the first time domain resource is determined, and the terminal begins to be served; afterward, according to all the terminals capable of being bound to each antenna element, the antenna element to which the first terminal is bound is determined as the first antenna element.

Figure 7:
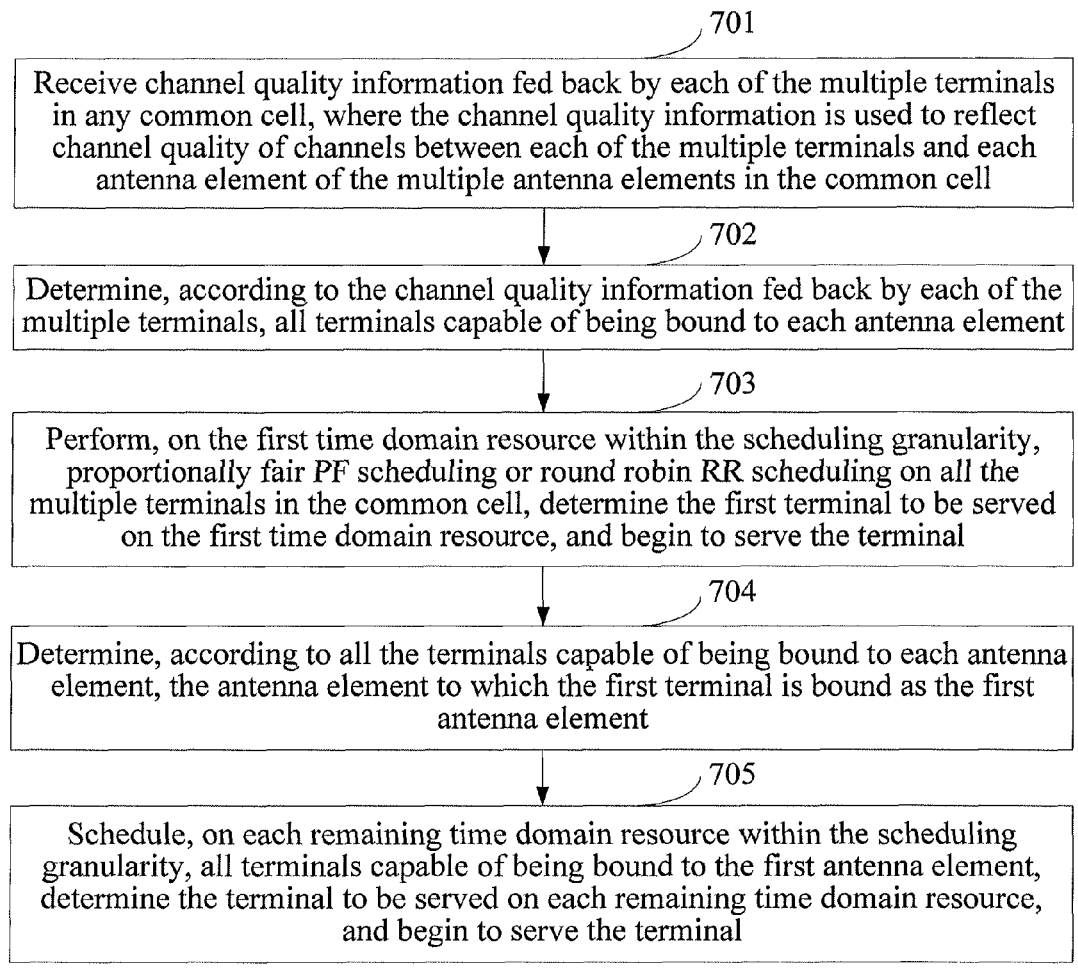
FIG. 7 is a flow chart of a method for scheduling terminals in a system with multiple antenna elements combining into a common cell according to another embodiment of the present disclosure.

FIG. 7 is a flow chart of a method for scheduling terminals in a system with multiple antenna elements combining into a common cell according to another embodiment of the present disclosure. As shown in FIG. 7, the method includes:

Step 701: Receive channel quality information fed back by multiple terminals in any common cell, where the channel quality information is configured to reflect channel quality of channels between the multiple terminals and each antenna element of the multiple antenna elements in the common cell.

Step 702: Determine, according to the channel quality information fed back by the multiple terminals, all terminals capable of being bound to each antenna element.

For the detailed implementation process of steps 701 and 702, see steps 501 and 502 in Embodiment 1. No repeated description is provided herein as detailed description is already provided in Embodiment 1.

Step 703: Perform, on the first time domain resource within the scheduling granularity, proportionally fair PF scheduling or round robin RR scheduling on the multiple terminals in the common cell, determine the first terminal to be served on the first time domain resource, and begin to serve the terminal.

Step 704: Determine, according to all the terminals capable of being bound to each antenna element, the antenna element to which the first terminal is bound as the first antenna element.

It should be noted that, in all embodiments of the present disclosure, "scheduling" refers to a process in which the base station selects a terminal according to the channel quality fed back by the terminal, and "serving" refers to a process in which the base station delivers data to the terminal after the terminal is determined through scheduling.

Figure 8:
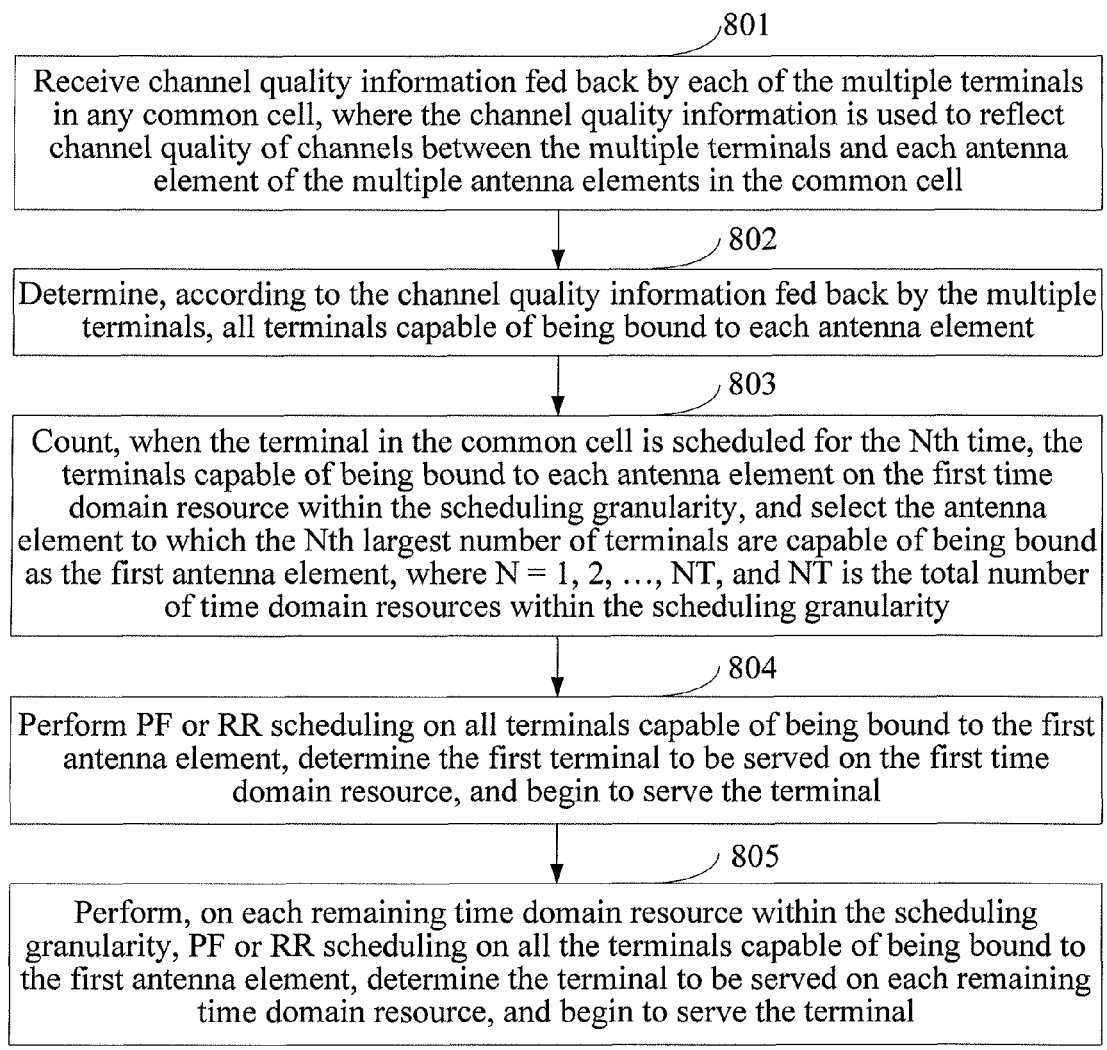
FIG. 8 is a flow chart of a method for scheduling terminals in a system with multiple antenna elements combining into a common cell according to another embodiment of the present disclosure.

Generally, within the scheduling granularity, the number of RBs (Resource Blocks, resource blocks) on the frequency domain is NF, and the number of RBs on the time domain is NT. For the bandwidth configuration, NF RBs are full-band resources; for the sub-band configuration, NF RBs are the bandwidths of the sub-bands. FIG. 8 is a schematic diagram of time-frequency resources of a scheduling granularity according to the present disclosure. On each time domain resource of the scheduling granularity, multiple antenna elements contend with each other, and use this time domain resource to schedule respective terminals served by this antenna elements. To fairly schedule all terminals in a common cell fairly in this embodiment, still taking the common cell in FIG. 6 as an example, the base station performs PF scheduling or RR scheduling on 8 terminals in the common cell jointly on the first time domain resource within the scheduling granularity, and determines the first terminal to be served on the first time domain resource. For example, after the PF scheduling, the first terminal to be served on the first time domain resource is determined as terminal 1, and, in step 702, the base station has determined, according to the channel quality information fed back by each terminal, all terminals capable of being bound to each antenna element. Therefore, the antenna element to which terminal 1 is bound can be determined as antenna element 1.

Step 705: Schedule, on each remaining time domain resource within the scheduling granularity, all terminals capable of being bound to the first antenna element, determine the terminal to be served on each remaining time domain resource, and begin to serve the terminal.

Scheduling, on each remaining time domain resource within the scheduling granularity, all terminals capable of being bound to the first antenna element, determining the terminal to be served on each remaining time domain resource, and beginning to serve the terminal include: performing PF or RR scheduling, on each remaining time domain resource within the scheduling granularity, on all the terminals capable of being bound to the first antenna element, determining the terminal to be served on each remaining time domain resource, and beginning to serve the terminal.

For example, after the first antenna element (antenna element 1) to which the first terminal (terminal 1) is bound is determined, PF scheduling is performed on all the terminals capable of being bound to the first antenna element (antenna element 1) on the second to the last time domain resources within the scheduling granularity. For example, in FIG. 6, on the second to the last time domain resources within the scheduling granularity, PF scheduling is performed on terminal 1 and terminal 2 bound to antenna element 1, the terminal to be served on the second to the last time domain resources is further determined, and the terminal begins to be served. It is assumed that after the PF scheduling is performed on terminal 1 and terminal 2, the terminal to be served on the second to the last time domain resources is terminal 2, and therefore, terminal 2 begins to be served.

At each scheduling, the terminal to be served on the first time domain resource is determined, and the terminal to be served on the second to the last time domain resources is determined according to steps 703 and 704. For any terminal in the multiple terminals within the common cell, the scheduling granularity at each scheduling is greater than a time difference between receiving the channel quality information fed back by the any terminal and beginning to serve the any terminal for the first time; and all the terminals capable of being bound to the first antenna element are determined according to all the terminals capable of being bound to each antenna element.

In this embodiment, through PF scheduling, the UE of the highest scheduling priority is selected for determining the antenna element on the first time domain resource, and a tradeoff is achieved between the fairness and system throughput.

As can be seen from the foregoing embodiments, in a common cell, the first antenna element and the terminal to be served on the first time domain resource are determined on the first time domain resource within the scheduling granularity; on each remaining time domain resource within the scheduling granularity, all the terminals capable of being bound to the first antenna element are scheduled, and the terminal to be served on each remaining time domain resource is further determined and begins to be served. In this way, the antenna element does not change within the whole scheduling granularity. Terminals in other common cells are interfered by the same antenna element all the time. That is, when the terminal feeds back the channel quality to the base station, and, when the base station begins to serve the terminal by delivering data, the terminal is interfered by signals transmitted by the same antenna element, which reduces the influences caused by interference fluctuation.

Embodiment 3

Different from Embodiment 2, this embodiment further limits step 503 in Embodiment 1.

That is, when the terminal in the common cell is scheduled for the Nth time, on the first time domain resource within the scheduling granularity, the antenna element to which the Nth largest number of terminals are capable of being bound is selected as the first antenna element, and all the terminals capable of being bound to the first antenna element are scheduled. In this way, the terminal to be served on the first time domain resource is determined.

FIG. 8 is a flow chart of a method for scheduling terminals in a system with multiple antenna elements combining into a common cell according to another embodiment of the present disclosure. As shown in FIG. 8, the method includes:

Step 801: Receive channel quality information fed back by multiple terminals in any common cell, where the channel quality information is configured to reflect channel quality of channels between the multiple terminals and each antenna element of the multiple antenna elements in the common cell.

Step 802: Determine, according to the channel quality information fed back by the multiple terminals, all terminals capable of being bound to each antenna element.

For the detailed implementation process of steps 801 and 802, see steps 501 and 502 in Embodiment 1. No repeated description is provided herein as detailed description is already provided in Embodiment 1.

Step 803: Count, when the terminal in the common cell is scheduled for the Nth time, the terminals capable of being bound to each antenna element on the first time domain resource within the scheduling granularity, and select the antenna element to which the Nth largest number of terminals are capable of being bound as the first antenna element, where N=1, 2, . . . , NT, and NT is the total number of time domain resources within the scheduling granularity.

At the first time of scheduling, on the first time domain resource scheduled, the counting shows that the largest number of terminals are capable of being bound to antenna element x and therefore, antenna element x is selected as the first antenna element. At the second time of scheduling, on the first time domain resource scheduled, the counting shows that the second largest number of terminals are capable of being bound to antenna element y and therefore, antenna element y is selected as the first antenna element, and so on.

For example, in the common cell shown in FIG. 6, 8 terminals in the common cell in FIG. 6 are scheduled for the first time, and the terminals capable of being bound to 4 antenna elements in the common cell are counted. It is assumed that the terminals capable of being bound to antenna element 1 are terminals 1, 2, and 8, the terminals capable of being bound to antenna element 2 are terminals 3 and 4, the terminals capable of being bound to antenna element 3 are terminals 5 and 6, and the terminal capable of being bound to antenna element 4 is terminal 7. As can be seen, the number of terminals capable of being bound to antenna element 1 is the largest, and is 3; the number of terminals capable of being bound to antenna elements 2 and 3 is the second largest, and is 2; the number of terminals capable of being bound to antenna element 4 is the smallest, and is 1. Therefore, at the first time of scheduling, antenna element 1 is selected as the first antenna element; at the second time of scheduling, the number of terminals capable of being bound to antenna element 2 is equal to the number of terminals capable of being bound to antenna element 3, both being 2, which is a special case. In such a special case, the PF scheduling is performed jointly on all 8 terminals in the common cell, a terminal is determined, and the antenna element to which this terminal is bound is determined as the first antenna element.

Step 804: Perform PF or RR scheduling on all terminals capable of being bound to the first antenna element, determine the first terminal to be served on the first time domain resource, and begin to serve the terminal.

After the first antenna element is determined through step 803, for example, the first antenna element is antenna element 1, the terminals capable of being bound to antenna element 1 are terminals 1, 2, and 8, and therefore, PF scheduling or RR scheduling is performed on terminals 1, 2, and 8, the first terminal to be served on the first time domain resource is determined, and the terminal begins to be served.

Step 805: Perform, on each remaining time domain resource within the scheduling granularity, PF or RR scheduling on all the terminals capable of being bound to the first antenna element, determine the terminal to be served on each remaining time domain resource, and begin to serve the terminal.

In this embodiment, the average fading values of channels to all users are sorted to select the first antenna element on the first time domain resource, which reduces the complexity and improves the scheduling fairness of the first time domain resource in the system scheduling period.

As can be seen from the foregoing embodiments, in a common cell, the first antenna element and the terminal to be served on the first time domain resource are determined on the first time domain resource within the scheduling granularity; on each remaining time domain resource within the scheduling granularity, all the terminals capable of being bound to the first antenna element are scheduled, and the terminal to be served on each remaining time domain resource is further determined and begins to be served. In this way, the antenna element does not change within the whole scheduling granularity. Terminals in other common cells are interfered by the same antenna element all the time. That is, when the terminal feeds back the channel quality to the base station, and, when the base station begins to serve the terminal by delivering data, the terminal is interfered by signals transmitted by the same antenna element, which reduces the influences caused by interference fluctuation.

In addition, at the time of scheduling the terminals in a common cell, multiple antenna elements contend for the same time domain resource in the scheduling granularity. Through proper allocation, all terminals in the common cell can be scheduled fairly.

Embodiment 4

Different from Embodiment 1, this embodiment further limits step 503 in Embodiment 1.

That is, when the terminal in the common cell is scheduled for the Nth time, on the first time domain resource within the scheduling granularity, the antenna element with the Nth smallest average fading value of channels between the antenna element and each terminal of the multiple terminals in the common cell is selected as the first antenna element. In this way, the terminal to be served on the first time domain resource is determined, and the terminal begins to be served.

Figure 9:
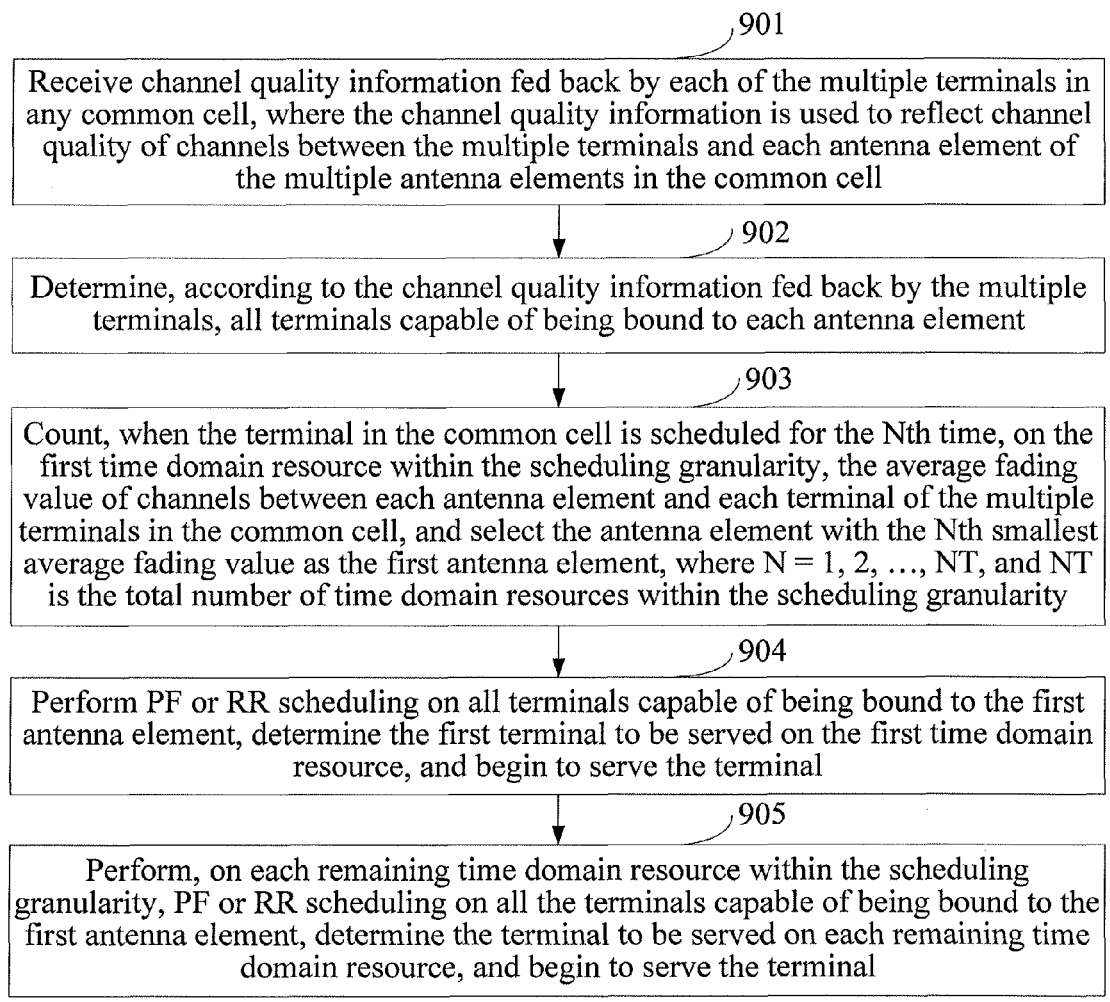
FIG. 9 is a flow chart of a method for scheduling terminals in a system with multiple antenna elements combining into a common cell according to another embodiment of the present disclosure.

FIG. 9 is a flow chart of a method for scheduling terminals in a system with multiple antenna elements combining into a common cell according to another embodiment of the present disclosure. As shown in FIG. 9, the method includes:

Step 901: Receive channel quality information fed back by multiple terminals in any common cell, where the channel quality information is configured to reflect channel quality of channels between the multiple terminals and each antenna element of the multiple antenna elements in the common cell.

Step 902: Determine, according to the channel quality information fed back by the multiple terminals, all terminals capable of being bound to each antenna element.

For the detailed implementation process of steps 901 and 902, see steps 501 and 502 in Embodiment 1. No repeated description is provided herein as detailed description is already provided in Embodiment 1.

Step 903: Count, when the terminal in the common cell is scheduled for the Nth time, on the first time domain resource within the scheduling granularity, the average fading value of channels between each antenna element and each terminal of the multiple terminals in the common cell, and select the antenna element with the Nth smallest average fading value as the first antenna element, where N=1, 2, ..., NT, and NT is the total number of time domain resources within the scheduling granularity.

At the first time of scheduling, on the first time domain resource within the scheduling granularity, the counting shows that the average fading value of channels between antenna element x and each terminal of the multiple terminals in the common cell is the smallest, and therefore, antenna element x is selected as the first antenna element. At the second time of scheduling, on the first time domain resource within the scheduling granularity, the counting shows that the average fading value of channels between antenna element y and each terminal of the multiple terminals in the common cell is the second smallest, and therefore, antenna element y is selected as the first antenna element, and so on.

For example, still taking the common cell shown in FIG. 6 as an example, on the first time domain resource within the scheduling granularity, the base station counts the fading value of channels between antenna element 1 and each terminal of the 8 terminals, and averages the 8 fading values to obtain the average fading value of channels between antenna element 1 and each terminal of the 8 terminals in the common cell. Likewise, the average fading value of channels between antenna elements 2, 3, and 4 and each terminal of the 8 terminals in the common cell may be obtained. The average fading values of the 4 antenna elements are compared. At the first time of scheduling, the antenna element with the smallest average fading value is selected as the first antenna element; at the second time of scheduling, the antenna element with the second smallest average fading value is selected as the first antenna element, and so on. If the comparison shows that the average fading value of antenna element 1 is the smallest, antenna element 1 is selected as the first antenna element at the first time of scheduling.

Step 904: Perform PF or RR scheduling on all terminals capable of being bound to the first antenna element, determine the first terminal to be served on the first time domain resource, and begin to serve the terminal.

After the first antenna element is determined through step 903, for example, the first antenna element is antenna element 1, all the terminals capable of being bound to antenna element 1 serve terminals 1, 2, and 8, and therefore, PF scheduling or RR scheduling is performed on terminals 1, 2, and 8, the first terminal to be served on the first time domain resource is determined, and the terminal begins to be served.

Step 905: Perform, on each remaining time domain resource within the scheduling granularity, PF or RR scheduling on all the terminals capable of being bound to the first antenna element, determine the terminal to be served on each remaining time domain resource, and begin to serve the terminal.

In this embodiment, the average fading values of channels to users served by antennas are sorted to select the antenna element on the first time domain resource, which reduces the complexity and improves performance in comparison with Embodiment 3.

As can be seen from the foregoing embodiments, in a common cell, the first antenna element and the terminal to be served on the first time domain resource are determined on the first time domain resource within the scheduling granularity; on each remaining time domain resource within the scheduling granularity, all the terminals capable of being bound to the first antenna element are scheduled, and the terminal to be served on each remaining time domain resource is further determined and begins to be served. In this way, the antenna element does not change within the whole scheduling granularity. Terminals in other common cells are interfered by the same antenna element all the time. That is, when the terminal feeds back the channel quality to the base station, and, when the base station begins to serve the terminal by delivering data, the terminal is interfered by signals transmitted by the same antenna element, which reduces the influences caused by interference fluctuation.

In addition, at the time of scheduling the terminals in a common cell, multiple antenna elements contend for the same time domain resource in the scheduling granularity. Through proper allocation, all terminals in the common cell can be scheduled fairly.

Embodiment 5

Figure 10:
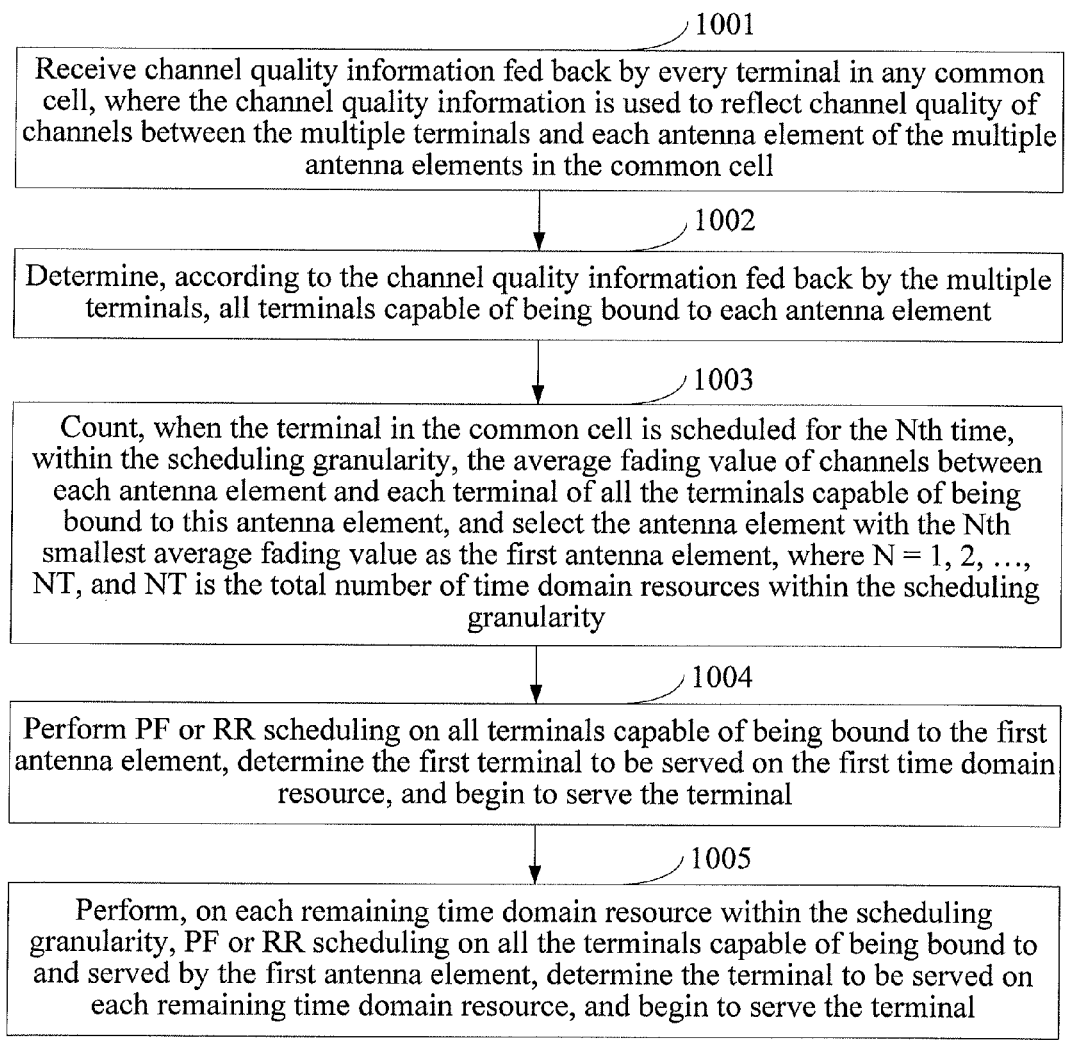
FIG. 10 is a flow chart of a method for scheduling terminals in a system with multiple antenna elements combining into a common cell according to another embodiment of the present disclosure.

Different from Embodiment 1, this embodiment counts the average fading value of channels between each antenna element in the common cell and each terminal of all the terminals capable of being bound when the terminal in the common cell is scheduled for the Nth time. FIG. 10 is a flow chart of a method for scheduling terminals in a system with multiple antenna elements combining into a common cell according to another embodiment of the present disclosure. As shown in FIG. 10, the method includes:

Step 1001: Receive channel quality information fed back by every terminal in any common cell, where the channel quality information is configured to reflect channel quality of channels between the multiple terminals and each antenna element of the multiple antenna elements in the common cell.

Step 1002: Determine, according to the channel quality information fed back by the multiple terminals, all terminals capable of being bound to each antenna element.

For the detailed implementation process of steps 1001 and 1002, see steps 501 and 502 in Embodiment 1. No repeated description is provided herein, as detailed description is already provided in Embodiment 1.

Step 1003: Count, when the terminal in the common cell is scheduled for the Nth time, on the first time domain resource within the scheduling granularity, the average fading value of channels between each antenna element and each terminal of all the terminals capable of being bound to this antenna element, and select the antenna element with the Nth smallest average fading value as the first antenna element, where N=1, 2, . . . , NT, and NT is the total number of time domain resources within the scheduling granularity.

At the first time of scheduling, on the first time domain resource within the scheduling granularity, the counting shows that the average fading value of channels between antenna element x and each terminal of all the terminals capable of being bound to this antenna element is the smallest, and therefore, antenna element x is selected. At the second time of scheduling, on the first time domain resource within the scheduling granularity, the counting shows that the average fading value of channels between antenna element y and each terminal of all the terminals capable of being bound to this antenna element is the second smallest, and therefore, antenna element y is selected, and so on.

For example, still taking the common cell shown in FIG. 6 as an example, the base station counts the fading value of channels between antenna element 1 and each of terminals 1, 2, and 8 capable of being bound to this antenna element, and averages the 3 fading values to obtain the average fading value of channels between antenna element 1 and each of the terminals capable of being bound to antenna element 1. Likewise, the average fading value of channels between antenna elements 2, 3, and 4 and each of the terminals capable of being bound thereto may be obtained. The average fading values of the 4 antenna elements are compared. At the first time of scheduling, the antenna element with the smallest average fading value is selected as the first antenna element; at the second time of scheduling, the antenna element with the second smallest average fading value is selected as the second antenna element, and so on. If the comparison shows that the average fading value of antenna element 2 is the smallest, antenna element 2 is selected as the first antenna element at the first time of scheduling.

Step 1004: Perform PF or RR scheduling on all terminals capable of being bound to the first antenna element, determine the first terminal to be served on the first time domain resource, and begin to serve the terminal.

After the first antenna element is determined through step 1003, for example, the first antenna element is antenna element 1, all the terminals capable of being bound to antenna element 1 are terminals 1, 2, and 8, and therefore, PF scheduling or RR scheduling is performed on terminals 1, 2, and 8, the first terminal to be served on the first time domain resource is determined, and the terminal begins to be served.

Step 1005: Perform, on each remaining time domain resource within the scheduling granularity, PF or RR scheduling on all the terminals capable of being bound to the first antenna element, determine the terminal to be served on each remaining time domain resource, and begin to serve the terminal.

In this embodiment, RR scheduling is performed on the second to the NTth time domain resources, which improves fairness for users from the second to the NTth time domain resources in the whole scheduling period.

As can be seen from the foregoing embodiments, in a common cell, the first antenna element and the terminal to be served on the first time domain resource are determined on the first time domain resource within the scheduling granularity; on each remaining time domain resource within the scheduling granularity, all the terminals capable of being bound to the first antenna element are scheduled, and the terminal to be served on each remaining time domain resource is further determined and begins to be served. In this way, the antenna element does not change within the whole scheduling granularity. Terminals in other common cells are interfered by the same antenna element all the time. That is, when the terminal feeds back the channel quality to the base station, and, when the base station begins to serve the terminal by delivering data, the terminal is interfered by signals transmitted by the same antenna element, which reduces the influences caused by interference fluctuation.

In addition, at the time of scheduling the terminals in a common cell, multiple antenna elements contend for the same time domain resource in the scheduling granularity. Through proper allocation, all terminals in the common cell can be scheduled fairly.

Embodiment 6

Figure 11:
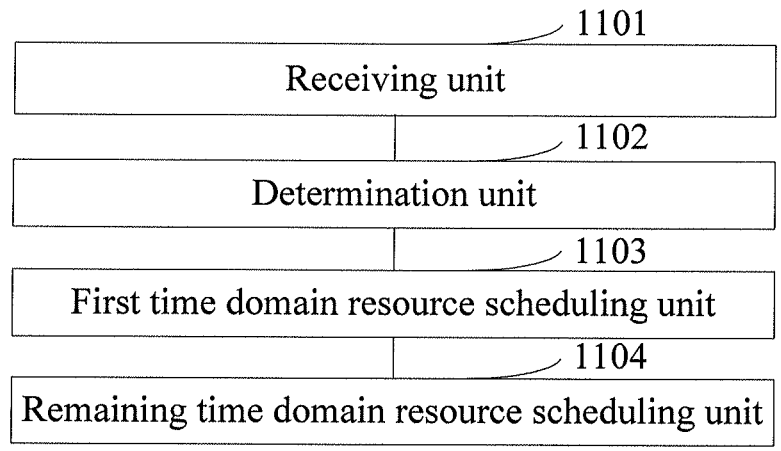
FIG. 11 is a structural diagram of an apparatus for scheduling terminals in a system with multiple antenna elements combining into a common cell according to an embodiment of the present disclosure.

Corresponding to the method in Embodiment 1, this embodiment of the present disclosure provides an apparatus for scheduling terminals in a system with multiple antenna elements combining into a common cell. FIG. 11 is a structural diagram of an apparatus for scheduling terminals in a system with multiple antenna elements combining into a common cell according to an embodiment of the present disclosure. As shown in FIG. 11, the apparatus includes: a receiving unit 1101, a determination unit 1102, a first time domain resource scheduling unit 1103, and a remaining time domain resource scheduling unit 1104. The following describes the internal structure and connection relationships of the apparatus with reference to the working principles of the apparatus.

The receiving unit 1101 is configured to receive channel quality information fed back by multiple terminals in the common cell, where the channel quality information is configured to reflect channel quality of channels between the multiple terminals and each antenna element of the multiple antenna elements in the common cell.

The common cell may be any common cell.

The determination unit 1102 is configured to determine, according to the channel quality information fed back by the multiple terminals, all terminals capable of being bound to each antenna element.

The first time domain resource scheduling unit 1103 is configured to determine a first antenna element among the antenna elements in the common cell on a first time domain resource within a scheduling granularity, determine a terminal to be served on the first time domain resource, and begin to serve the terminal.

The remaining time domain resource scheduling unit 1104 is configured to schedule all terminals capable of being bound to the first antenna element on each remaining time domain resource within the scheduling granularity, determine a terminal to be served on each remaining time domain resource, and begin to serve the terminal, where the scheduling granularity for any terminal of the multiple terminals in the common cell is greater than a time difference between receiving the channel quality information fed back by the any terminal and beginning to serve the any terminal for the first time, and all the terminals capable of being bound to the first antenna element are determined according to all the terminals capable of being bound to each antenna element.

Figure 12A:
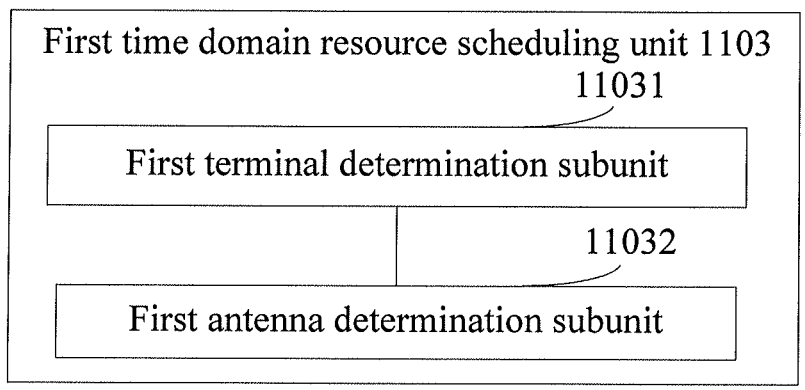
FIG. 12*a* is a schematic structural diagram of a first time domain resource scheduling unit according to the present disclosure.

Exemplarily, as shown in FIG. 12a, which is a schematic structural diagram of a first time domain resource scheduling unit in the present disclosure, the first time domain resource scheduling unit 1103 further includes: a first terminal determination subunit 11031 and a first antenna determination subunit 11032.

The first terminal determination subunit 11031 is configured to perform, on the first time domain resource within the scheduling granularity, proportionally fair PF scheduling or round robin RR scheduling on multiple terminals in the common cell, determine the first terminal to be served on the first time domain resource, and begin to serve the terminal.

The first antenna determination subunit 11032 is configured to determine, according to all the terminals capable of being bound to each antenna element, the antenna element to which the first terminal is bound as the first antenna element.

Figure 12B:
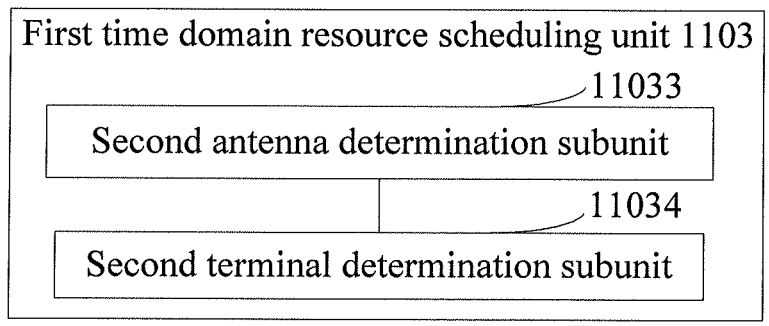
FIG. 12*b* is a schematic structural diagram of a first time domain resource scheduling unit according to the present disclosure.

In addition, alternatively, the first terminal determination subunit in FIG. 12a is replaced with a second terminal determination subunit, and the first antenna determination subunit is replaced with a second antenna determination subunit. As shown in FIG. 12b, the first time domain resource scheduling unit 1103 includes a second antenna determination subunit 11033 and a second terminal determination subunit 11034.

The second antenna determination subunit 11033 is configured to count, when the terminal in the common cell is scheduled for the Nth time, the terminals capable of being bound to each antenna element on the first time domain resource within the scheduling granularity, and select the antenna element to which the Nth largest number of terminals are capable of being bound as the first antenna element, where N=1, 2, . . . , NT, and NT is the total number of time domain resources within the scheduling granularity.

The second terminal determination subunit 11034 is configured to perform PF or RR scheduling on all terminals capable of being bound to the first antenna element, determine the first terminal to be served on the first time domain resource, and begin to serve the terminal.

Figure 12C:
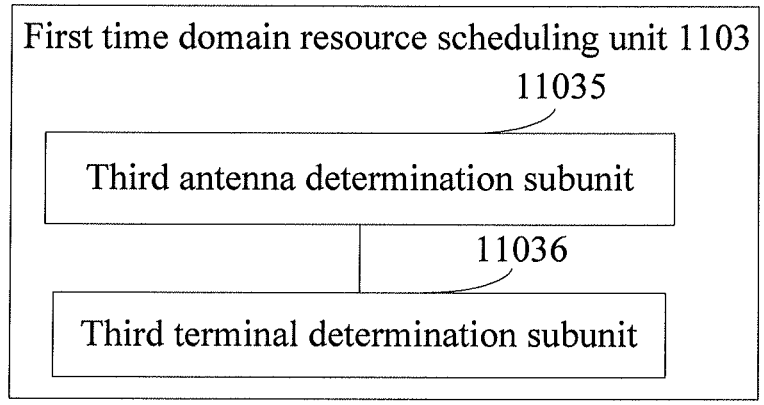
FIG. 12*c* is a schematic structural diagram of a first time domain resource scheduling unit according to the present disclosure.

Alternatively, as shown in FIG. 12c, in another structure of the first time domain resource scheduling unit 1103, the first time domain resource scheduling unit includes a third antenna determination subunit 11035 and a third terminal determination subunit 11036.

The third antenna determination subunit 11035 is configured to count, when the terminal in the common cell is scheduled for the Nth time, on the first time domain resource within the scheduling granularity, the average fading value of channels between each antenna element and each terminal of the multiple terminals in the common cell, and select the antenna element with the Nth smallest average fading value as the first antenna element, where N=1, 2, . . . , NT, and NT is the total number of time domain resources within the scheduling granularity.

The third terminal determination subunit 11036 is configured to perform PF or RR scheduling on all terminals capable of being bound to the first antenna element, determine the first terminal to be served on the first time domain resource, and begin to serve the terminal.

Figure 12D:
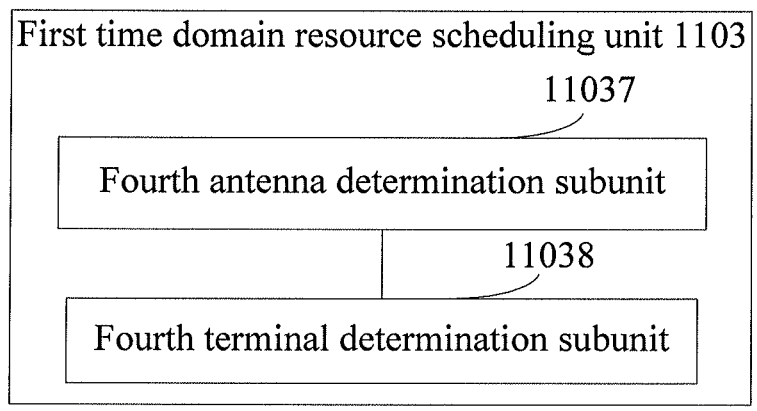
FIG. 12*d* is a schematic structural diagram of a first time domain resource scheduling unit according to the present disclosure.

Alternatively, as shown in FIG. 12d, the third antenna determination subunit can be replaced with a fourth antenna determination subunit, and the third terminal determination subunit is replaced with a fourth terminal determination subunit. Therefore, the scheduling unit 1103 includes a fourth antenna determination subunit 11037 and a fourth terminal determination subunit 11038.

The fourth antenna determination subunit 11037 is configured to count, when the terminal in the common cell is scheduled for the Nth time, on the first time domain resource within the scheduling granularity, the average fading value of channels between each antenna element and each terminal of all the terminals capable of being bound to this antenna element, and select a serving antenna element with the Nth smallest average fading value as the first antenna element, where N=1, 2, . . . , NT, and NT is the total number of time domain resources within the scheduling granularity.

The fourth terminal determination subunit 11038 is configured to perform PF scheduling or RR scheduling on all terminals capable of being bound to the first antenna element, determine the first terminal to be served on the first time domain resource, and begin to serve the terminal.

In addition, the remaining time domain resource scheduling unit 1104 further includes a fifth terminal determination subunit, which is configured to perform, on each remaining time domain resource within the scheduling granularity, PF or RR scheduling on all terminals capable of being bound to the first antenna element, determine the terminal to be served on each remaining time domain resource, and begin to serve the terminal.

It should be noted that the apparatus for scheduling terminals in this embodiment may be integrated inside the base station or be independent from the base station, which is not limited in the present disclosure.

As can be seen from the foregoing embodiments, in a common cell, the first antenna element and the terminal to be served on the first time domain resource are determined on the first time domain resource within the scheduling granularity; on each remaining time domain resource within the scheduling granularity, all the terminals capable of being bound to the first antenna element are scheduled, and the terminal to be served on each remaining time domain resource is further determined and begins to be served. In this way, the antenna element does not change within the whole scheduling granularity. Terminals in other common cells are interfered by the same antenna element all the time. That is, when the terminal feeds back the channel quality to the base station, and, when the base station begins to serve the terminal by delivering data, the terminal is interfered by signals transmitted by the same antenna element, which reduces the influences caused by interference fluctuation.

In addition, at the time of scheduling the terminals in a common cell, multiple antenna elements contend for the same time domain resource in the scheduling granularity. Through proper allocation, all terminals in the common cell can be scheduled fairly.

Embodiment 7

Figure 13:
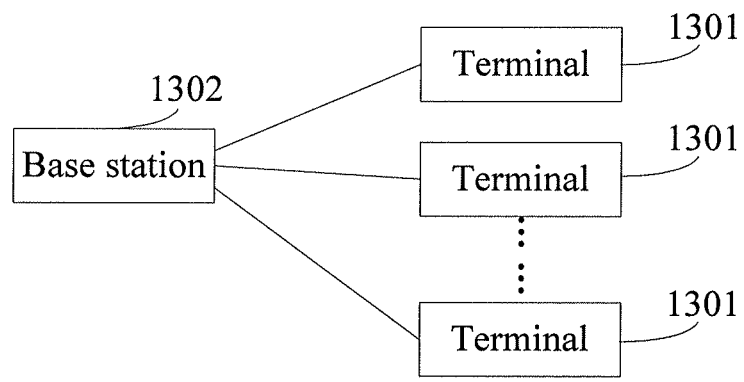
FIG. 13 is a structural diagram of a system with multiple antenna elements combining into a common cell according to an embodiment of the present disclosure.

The embodiment of the present disclosure provides a system with multiple antenna elements combining into a common cell. FIG. 13 is a structural diagram of a system with multiple antenna elements combining into a common cell according to an embodiment of the present disclosure. The system includes multiple terminals 1301 and a base station 1302. The following describes the internal structure and connection relationships of the apparatus with reference to the working principles of the apparatus.

Each terminal 1301 is configured to feed back channel quality information to the base station 1302, where the channel quality information is configured to reflect channel quality of channels between each terminal 1301 and each antenna element of the multiple antenna elements in the common cell.

The base station 1302 is configured to receive the channel quality information fed back by the multiple terminals in the common cell; determine, according to the channel quality information fed back by the multiple terminals 1301, all terminals capable of being bound to each antenna element; determine a first antenna element among the antenna elements in the common cell on a first time domain resource within a scheduling granularity, determine a terminal to be served on the first time domain resource, and begin to serve the terminal; and schedule all terminals capable of being bound to the first antenna element on each remaining time domain resource within the scheduling granularity, determine a terminal to be served on each remaining time domain resource, and begin to serve the terminal, where the scheduling granularity for any terminal of the multiple terminals in the common cell is greater than a time difference between receiving the channel quality information fed back by the any terminal and beginning to serve the any terminal for the first time, and all the terminals capable of being bound to the first antenna element are determined according to all the terminals capable of being bound to each antenna element.

Exemplarily, the system includes Long Term Evolution (LTE), Wideband Code Division Multiple Access (WCDMA), and Time Division Synchronous Code Division Multiple Access (TD-SCDMA).

As can be seen from the foregoing embodiments, in a common cell, the first antenna element and the terminal to be served on the first time domain resource are determined on the first time domain resource within the scheduling granularity; on each remaining time domain resource within the scheduling granularity, all the terminals capable of being bound to the first antenna element are scheduled, and the terminal to be served on each remaining time domain resource is further determined and begins to be served. In this way, the antenna element does not change within the whole scheduling granularity. Terminals in other common cells are interfered by the same antenna element all the time. That is, when the terminal feeds back the channel quality to the base station, and, when the base station begins to serve the terminal by delivering data, the terminal is interfered by signals transmitted by the same antenna element, which reduces the influences caused by interference fluctuation.

It should be noted that persons of ordinary skill in the art can understand that all or part of the steps of the method provided in the embodiments above may be implemented by a program instructing relevant hardware. The program may be stored in a computer readable storage medium. When the program is run, the procedures of each method embodiment above may be executed. The storage medium may be a magnetic disk, an optical disk, a read-only memory (Read-Only Memory, ROM) or a random access memory (Random Access Memory, RAM).

A method and an apparatus for scheduling terminals in a system with multiple antenna elements combining into a common cell are described in detail above. Although the principle and implementation of the present disclosure are described with reference to the exemplary embodiments, the embodiments are only intended to help understand the method and core idea of the present disclosure. In addition, with respect to the implementation and application scope of the present disclosure, modifications and variations may be made by persons of ordinary skill in the art according to the idea of the present disclosure. Therefore, the specification shall not be construed as a limit to the present disclosure.

What is claimed is:

1. A method for scheduling terminals in a system comprising a common cell that comprises multiple antennas and multiple terminals, the method comprising:

receiving, by a base station, channel quality information fed back by the multiple terminals in the common cell, wherein the channel quality information is configured to reflect channel quality of channels between the multiple terminals and each antenna of the multiple antennas in the common cell;

determining, by the base station, according to the channel quality information fed back by the multiple terminals, all terminals which each antenna is capable of serving;

determining, by the base station, a first antenna among the multiple antennas in the common cell on a first time domain resource within a scheduling granularity, determining a terminal to be served on the first time domain resource, and beginning to serve the terminal; and scheduling, by the base station, all terminals which the first antenna is capable of serving on each remaining time domain resource within the scheduling granularity, determining a terminal to be served on each remaining time domain resource, and beginning to serve the terminal, wherein the scheduling granularity for any terminal of the multiple terminals in the common cell is greater than a time difference between receiving the channel quality information fed back by the any terminal and beginning to serve the any terminal, and all the terminals which the first antenna is capable of serving are determined according to all the terminals each antenna is capable of serving.

2. The method according to claim 1, wherein the determining, by the base station, a first antenna among the multiple antennas in the common cell on a first time domain resource within a scheduling granularity, determining a terminal to be served on the first time domain resource, and beginning to serve the terminal comprise:

performing, on the first time domain resource within the scheduling granularity, proportionally fair (PF) scheduling or round robin (RR) scheduling on the multiple terminals in the common cell, and determining the first terminal to be served on the first time domain resource, and beginning to serve the terminal; and determining an antenna which is capable of serving the first terminal as the first antenna according to all the terminals capable of being bound to each antenna.

3. The method according to claim 1, wherein the determining, by the base station, a first antenna among the multiple antennas in the common cell on a first time domain resource within a scheduling granularity, determining a terminal to be served on the first time domain resource, and beginning to serve the terminal comprise:

counting, when the terminal in the common cell is scheduled for the Nth time, the terminals each antenna is capable of serving on the first time domain resource within the scheduling granularity, and selecting the antenna to which is capable of serving the Nth largest number of terminals as the first antenna, wherein N=1, 2, . . . , NT, and NT is the total number of time domain resources within the scheduling granularity; and performing proportionally fair (PF) or round robin (RR) scheduling on all terminals which the first antenna is capable of serving, determining the first terminal to be served on the first time domain resource, and beginning to serve the terminal.

4. The method according to claim 1, wherein the determining, by the base station, a first antenna among the multiple antennas in the common cell on a first time domain resource within a scheduling granularity, determining a terminal to be served on the first time domain resource, and beginning to serve the terminal comprise:

counting, when the terminal in the common cell is scheduled for the Nth time, on the first time domain resource within the scheduling granularity, an average fading value of channels between each antenna and each terminal of the multiple terminals in the common cell, and selecting an antenna with the Nth smallest average fading value as the first antenna, wherein N=1, 2, . . . , NT, and NT is the total number of time domain resources within the scheduling granularity; and performing PF or RR scheduling on all the terminals which the first antenna is capable of serving, determining the first terminal to be served on the first time domain resource, and beginning to serve the terminal.

5. The method according to claim 1, wherein the determining, by the base station, a first antenna among the antennas in the common cell on a first time domain resource within a scheduling granularity, determining a terminal to be served on the first time domain resource, and beginning to serve the terminal comprise:

counting, when the terminal in the common cell is scheduled for the Nth time, on the first time domain resource within the scheduling granularity, an average fading value of channels between each antenna and each terminal of all the terminals the antenna is capable of serving, and selecting a serving antenna with the Nth smallest average fading value as the first antenna, wherein N=1, 2, . . . , NT, and NT is the total number of time domain resources within the scheduling granularity; and performing PF or RR scheduling on all the terminals which the first antenna is capable of serving, determining the first terminal to be served on the first time domain resource, and beginning to serve the terminal.

6. The method according to claim 1, wherein the scheduling, by the base station, all the terminals which the first antenna is capable of serving on each remaining time domain resource within the scheduling granularity, determining a terminal to be served on each remaining time domain resource, and beginning to serve the terminal comprise:

performing, on each remaining time domain resource within the scheduling granularity, PF scheduling or RR scheduling on all the terminals which the first antenna is capable of serving, determining the terminal to be served on each remaining time domain resource, and beginning to serve the terminal.

7. An apparatus for scheduling terminals in a system comprising a common cell that comprises multiple antennas and multiple terminals, the apparatus comprising: a processor and memory having program code stored therein, the code executed on the processor configures the apparatus to:

receive channel quality information fed back by the multiple terminals in the common cell, wherein the channel quality information is configured to reflect channel quality of channels between the multiple terminals and each antenna of the multiple antennas in the common cell;

determine, according to the channel quality information fed back by the multiple terminals, all terminals which antenna is capable of serving;

determine a first antenna among the multiple antennas in the common cell on a first time domain resource within a scheduling granularity, determine a terminal to be served on the first time domain resource, and begin to serve the terminal; and schedule all terminals which the first antenna is capable of serving on each remaining time domain resource within the scheduling granularity, determine a terminal to be served on each remaining time domain resource, and begin to serve the terminal, wherein the scheduling granularity for any terminal of the multiple terminals in the common cell is greater than a time difference between receiving the channel quality information fed back by the any terminal and beginning to serve the any terminal, and all the terminals the first antenna is capable of serving are determined according to all the terminals which each antenna is capable of serving.

8. The apparatus according to claim 7, wherein the code executed on the processor configures the apparatus to:

perform, on the first time domain resource within the scheduling granularity, proportionally fair PF scheduling or round robin RR scheduling on the multiple terminals in the common cell, determine the first terminal to be served on the first time domain resource, and begin to serve the terminal; and determine, according to all the terminals which each antenna is capable of serving, an antenna which is capable of serving the first terminal as the first antenna.

9. The apparatus according to claim 7, wherein the code executed on the processor configures the apparatus to:

count, when the terminal in the common cell is scheduled for the Nth time, the terminals which each antenna is capable of serving on the first time domain resource within the scheduling granularity, and select an antenna which is capable of serving the Nth largest number of terminals as the first antenna, wherein N=1, 2, . . . , NT, and NT is the total number of time domain resources within the scheduling granularity; and perform PF scheduling or RR scheduling on all the terminals the first antenna is capable of serving, determine the first terminal to be served on the first time domain resource, and begin to serve the terminal.

10. The apparatus according to claim 7, wherein the code executed on the processor configures the apparatus to:

count, when the terminal in the common cell is scheduled for the Nth time, on the first time domain resource within the scheduling granularity, an average fading value of channels between each antenna and each terminal of the multiple terminals in the common cell, and select an antenna with the Nth smallest average fading value as the first antenna, wherein N=1, 2, . . . , NT, and NT is the total number of time domain resources within the scheduling granularity; and perform PF or RR scheduling on all the terminals which the first antenna is capable of serving, determine the first terminal to be served on the first time domain resource, and begin to serve the terminal.

11. The apparatus according to claim 7, wherein the code executed on the processor configures the apparatus to:

count, when the terminal in the common cell is scheduled for the Nth time, on the first time domain resource within the scheduling granularity, an average fading value of channels between each antenna and each terminal of all the terminals which the antenna is capable of serving, and select a serving antenna with the Nth smallest average fading value as the first antenna, wherein N=1, 2, ..., NT, and NT is the total number of time domain resources within the scheduling granularity; and perform PF or RR scheduling on all the terminals which the first antenna is capable of serving, determine the first terminal to be served on the first time domain resource, and begin to serve the terminal.

12. The apparatus according to claim 7, wherein the code executed on the processor configures the apparatus to:

perform, on each remaining time domain resource within the scheduling granularity, PF or RR scheduling on all the terminals which the first antenna is capable of serving, determine the terminal to be served on each remaining time domain resource, and begin to serve the terminal.

13. A system with multiple antennas combining into a common cell, comprising a base station and multiple terminals, wherein:

each terminal of the multiple terminals is configured to feed back channel quality information to the base station, wherein the channel quality information is configured to reflect channel quality of channels between each terminal of the multiple terminals and each antenna of the multiple antennas in the common cell; and the base station is configured to receive the channel quality information fed back by the multiple terminals in the common cell; determine, according to the channel quality information fed back by the multiple terminals, all terminals which each antenna is capable of serving; determine a first antenna among the multiple antennas in the common cell on a first time domain resource within a scheduling granularity, determine a terminal to be served on the first time domain resource, and begin to serve the terminal; and schedule all terminals which the first antenna is capable of serving on each remaining time domain resource within the scheduling granularity, determine a terminal to be served on each remaining time domain resource, and begin to serve the terminal, wherein the scheduling granularity for any terminal of the multiple terminals in the common cell is greater than a time difference between receiving the channel quality information fed back by the any terminal and beginning to serve the any terminal, and all the terminals which the first antenna is capable of serving are determined according to all the terminals which each antenna is capable of serving.

14. The system according to claim 13, wherein the system comprises a Long Term Evolution (LTE) system, a Wideband Code Division Multiple Access (WCDMA) system, and a Time Division Synchronous Code Division Multiple Access (TD-SCDMA) system.

* * * * *